UNITED STATES PATENT OFFICE.

ELIAS ZERBEY, OF LEBANON, PENNSYLVANIA.

IMPROVEMENT IN LUBRICANTS.

Specification forming part of Letters Patent No. 150,739, dated May 12, 1874; application filed February 5, 1874.

*To all whom it may concern:*

Be it known that I, ELIAS ZERBEY, of Lebanon, in the county of Lebanon and State of Pennsylvania, have invented a new and useful Improvement in Lubricants and Packings for Steam - Engines, Steam-Chests, Journals, Bearings, Stuffing-Boxes, and in general such parts of machinery as are liable to friction, or the effects of heat; and I do hereby declare the following to be a full, clear, and exact description thereof, which will enable others skilled in the art to which it appertains to practice my invention.

This improvement consists in the application of the mineral mica to the purpose of a lubricant or packing for machinery, and the mode in which I prefer to practice the invention is as follows: The mica is first heated till it loses its elasticity, and is next put into water; then taken out of the water and ground in a mill, or by any other suitable means; or it may be pulverized without being placed in the water after being heated; or it may be pulverized without being heated. In this pulverized condition it is mixed with oil, and applied to the part to be lubricated.

When used as a packing for steam-chests, &c., it may be mixed with cotton, hemp, or any similar fibrous substance.

It is applied in this way as a packing for furnace, steam, and hot-air pipes, or any other similar tubes for conveying steam; also, to steam-engines and steam-boilers.

What I claim as my invention, and desire to secure by Letters Patent of the United States, is—

Pulverized mica mixed with oil, as a lubricant and packing for steam-engines, steam-boilers, steam and hot air pipes, axles, journals, bearings, stuffing-boxes, and all parts of machinery which are exposed to friction or the effects of heat, and in general where a non-conductor of heat is required.

ELIAS ZERBEY.

Witnesses:
  WM. W. MURRAY,
  JAMES E. ZERBE.